United States Patent [19]
Burns et al.

[11] Patent Number: 6,013,740
[45] Date of Patent: Jan. 11, 2000

[54] SHEET AND TUBE POLYMERS WITH PENDANT SILOXANE GROUPS

[75] Inventors: Gary Thomas Burns, Ohain, Belgium; Timothy Chi-Shan Chao, Midland, Mich.; Aref Ben Ahmed Jallouli, Midland, Mich.; Dimitris Elias Katsoulis, Midland, Mich.

[73] Assignees: Dow Corning Corporation, Midland, Mich.; Virginia Institute and State University, Blacksburg, Va.

[21] Appl. No.: 09/140,902

[22] Filed: Aug. 27, 1998

[51] Int. Cl.⁷ ............................... C08F 283/12; C08G 5/54
[52] U.S. Cl. .......................... 525/477; 528/39; 524/262; 524/263; 524/588; 524/731; 524/858; 524/863; 524/268
[58] Field of Search ............................. 525/477; 524/262, 524/263, 268, 588, 731, 863, 858; 528/39

[56] References Cited

U.S. PATENT DOCUMENTS

| | | |
|---|---|---|
| 3,162,662 | 12/1964 | Brown ................................... 260/448 |
| 3,904,583 | 9/1975 | Saunders et al. .................. 260/46.5 R |
| 5,605,982 | 2/1997 | Chao ..................................... 525/474 |
| 5,627,241 | 5/1997 | Chen ..................................... 525/474 |

Primary Examiner—Margaret G. Moore
Attorney, Agent, or Firm—James L. De Cesare

[57] ABSTRACT

Polysiloxane sheet or tube polymers having pendant siloxane groups are prepared by contacting sheet or tube silicates with halogen endblocked halosiloxanes represented by the formula:

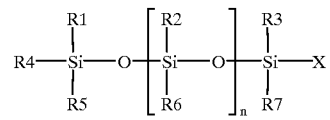

where X is chlorine, fluorine, bromine, or iodine; R1 to R7 are alkyl groups with 1–6 carbon atoms, aryl groups, alkaryl groups, or aralkyl groups; in which one of the groups R1, R4, and R5 can additionally represent X; and n has a value of 2 to about 20.

7 Claims, No Drawings

6,013,740

SHEET AND TUBE POLYMERS WITH PENDANT SILOXANE GROUPS

STATEMENT REGARDING FEDERALLY SPONSORED RESEARCH OR DEVELOPMENT

The U.S. Government has a paid up license in this invention, and the right in limited circumstances, to require the patent owner to license others on reasonable terms, as provided for by the terms of Research Grant No. 95-G-05, awarded by the Federal Aviation Administration.

CROSS-REFERENCE TO RELATED APPLICATIONS

Not applicable.

REFERENCE TO A MICROFICHE APPENDIX

Not applicable.

FIELD OF THE INVENTION

This invention is directed to polymers derived from naturally occurring sheet silicates, synthetic sheet silicates, naturally occurring tube silicates, and synthetic tube silicates; and to gels and composites made therefrom.

BACKGROUND OF THE INVENTION

While U.S. Pat. No. 5,605,982 (Feb. 25, 1997), and U.S. Pat. No. 5,627,241 (May 6, 1997), describe processes for making organopolysiloxane sheet or tube polymers by contacting sheet or tube silicates with halogen containing organosilicon compounds, they do not teach reacting an halogen endblocked monohalosiloxane or halogen endblocked dihalosiloxane with sheet silicates or tube silicates, to produce sheet or tube-like siloxane polymers containing pendant siloxane groups. Another advantage of these pendant groups is that they allow the sheets and the tubes to crosslink forming gels and composite silicone matrices. These polymers are believed to be the first known sheet siloxanes and tube siloxanes.

BRIEF SUMMARY OF THE INVENTION

This invention relates to a method of making a polysiloxane sheet or tube polymer, to the resulting polysiloxane sheet or tube polymers, and to certain gelatinous and composite materials prepared from polysiloxane sheet or tube polymers. The polysiloxane sheet or tube polymer is made by contacting a sheet or tube silicate with an halogen endblocked monohalosiloxane or halogen endblocked dihalosiloxane and a solvent, and heating the mixture until a polysiloxane sheet or tube polymer is formed having pendant siloxane groups.

These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

This invention describes new sheet polymers, and their synthesis from halosiloxanes and sheet silicates such as apophyllite (hereinafter abbreviated "A"), magadiite, and kenyaite. Tube silicates such as $K_2CuSi_4O_{10}$ can also be used as a precursor. One example of an especially preferred halogen endblocked monohalosiloxane that may be used to prepare the sheet and tube polymer is the oligomer $(CH_3)_3Si[OSi(CH_3)_2]_3Cl$, hereafter referred to as "$MD_3Cl$", where D represents the difunctional unit $(CH_3)_2SiO_{2/2}$ and M represents the monofunctional unit $(CH_3)_3SiO_{1/2}$.

These new polymers such as A—$D_3M$ can be used to form gels by mixing them with a variety of silicone fluids such as octamethylcyclotetrasiloxane ($D_4$), methyl or silanol terminated polydimethylsiloxanes (PDMS), or vinyl (Vi) terminated PDMS. The polymers can also be used to form gels in silicone resin matrices such as a resin matrix formed from $(CH_3SiO_{1.5})_{0.75}[CH_2=CH(CH_3)_2SiO_{0.5}]_{0.25}$ and cyclic polysiloxane hydrides such as $D_4H$.

Unexpectedly, apophyllite (A), a sheet silicate, was found to be stable in halosiloxanes, and thus it was possible to prepare a series of silylated sheet polymers from the apophyllite mineral. This is an advantage and benefit when one considers that other common materials such as clay or clay-like compositions are not stable in halosiloxanes, and this is evidenced by the fact that they form oligomers during silylation.

Thus, exfoliated sheet structures were formed by treating apophyllite mineral with halogen endblocked monohalosiloxane oligomer $(CH_3)_3Si[OSi(CH_3)_2]_3Cl$, i.e., $MD_3Cl$. As used herein, the term "exfoliated" is intended to mean a disordering or an ordering reduced to a significant extent, of individual layers of the silicate polymer, such that individual layers separate from one another, as well as lose their ordered arrangement.

The resulting sheet polymer A—$D_3M$ contained pendant siloxane groups, and this characteristic enabled the polymer to be compatible with a variety of different silicone fluids. Swelling and gel formation was used as an indication of the presence of exfoliation. Thus, the disappearance of low angle peaks in their analysis by powder x-ray diffractometry (XRD), supported formation of exfoliated nanocomposites. In addition, transmission electron microscopy (TEM) of an elastomer containing about 5% by weight of A—$D_3M$ also suggested the formation of an exfoliated nanocomposite.

By incorporating these exfoliated sheet polymers with other materials, one is able to prepare a variety of new silicon atom containing fluids, elastomers, and resins. Such nanocomposite materials are useful in high temperature applications, for example as rheology additives, barrier materials, or lubricants, and as fillers in high strength elastomers.

One sheet silicate especially preferred herein is apophyllite mineral apophyllite $KCa_4Si_8O_{20}(OH,F).8H_2O$. The most preferred tube silicate is the synthetic silicate $K_2CuSi_4O_{10}$. Other natural and synthetic sheet and tube silicates can also be used such as magadiite $Na_2Si_{14}O_{29}.7H_2O$; kenyaite $Na_2Si_{22}O_{45}.9H_2O$; silinaite $NaLiSi_2O_5.2H_2O$; and chrysotile $Mg_3(OH)_4Si_2O_5$.

Sheet silicates such as apophyllite and other such silicates are commercially available from sources such as Ward's Natural Science Establishment, Rochester, N.Y.; and Gelest, Tullytown, Pa.. In addition, methods of preparing tube silicates such as $K_2CuSi_4O_{10}$ are described in various publications including U.S. Pat. No. 4,942,026 (Jul. 17, 1990); U.S. Pat. No. 5,605,982 (Feb. 25, 1997); U.S. Pat. No. 5,627,241 (May 6, 1997); *Polymer Preprints* (American Chemical Society, Division of Polymer Chemistry) Volume 32(3), Pages 508–509, (1991); and *Colloids and Surfaces*, Volume 63, Pages 139–149, (1992).

Halogen endblocked halosiloxanes suitable for use according to this invention are represented by the formula:

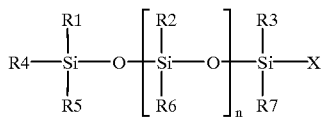

In the formula, X represents chlorine, fluorine, bromine, or iodine; R1 to R7 are each an alkyl radical containing 1–6 carbon atoms such as methyl, ethyl, propyl, isopropyl, butyl, isobutyl, pentyl, and hexyl; an aryl group such as phenyl and xenyl; an alkaryl (alkylaryl) group such as tolyl and xylyl; or an aralkyl (arylalkyl) group such as benzyl, phenylethyl, and 2-phenylpropyl. The integer n can have a value of from 2 to about 20.

While halogen endblocked monohalosiloxanes are especially preferred, halogen endblocked dihalosiloxanes can also be used, in which case, one of the R1, R4, and R5 groups in the above formula is X. Methods for preparing such halosiloxanes are described in U.S. Pat. No. 3,162,662 (Dec. 22, 1964), the disclosure of which is incorporated herein by reference.

A typical synthesis involves reacting halogen endblocked monohalosiloxanes, halogen endblocked dihalosiloxanes, or mixtures thereof, with a sheet silicate or tube silicate to produce a sheet-like or tube-like siloxane polymer containing pendant siloxane groups. It should be noted that other organosilicon compounds can also be included as components in the synthesis such as trimethylchlorosilane $(CH_3)_3SiCl$. The reaction can be carried out in the presence of a solvent, and some representative polar solvents that may be used include N,N-dimethylformamide (DMF), dimethyl sulfoxide (DMSO), 1-methyl-2-pyrrolidinone, and 1,3-dimethyl-3,4,5,6-tetrahydro-2(1H)-pyrimidinone (DMPU). The reaction can also be carried out in the presence of a mixture of a polar solvent and a non-polar solvent, such as N,N-dimethylformamide and toluene.

EXAMPLES

The following examples are set forth to illustrate the invention in more detail.

In these examples, $MD_3Cl$, i.e., $(CH_3)_3Si[OSi(CH_3)_2]_3Cl$ was synthesized. The purity of the product was 90% as determined by gas chromatography (GC), and the yield was about 50%. The product resulting from the treatment of apophyllite mineral with $MD_3Cl$ was the polymer A—$D_3M$.

Transmission electron microscopy (TEM) showed exfoliation of the sheet silicate in a cured system containing a silanol terminated polydimethylsiloxane (PDMS) having a molecular weight of about 4200 in which A—$D_3M$ was present as a filler at about 5% by weight. Analysis by X-ray powder diffraction (XRD) showed disappearance of low angle peaks, and this supported what had been observed in the TEM analysis.

When compared to a Cabot TS-530 fumed silica material, the A—$D_3M$ filled silanol terminated polydimethylsiloxane had a higher viscosity before curing, and it had a higher tensile strength after curing. The fumed silica material TS-530 used in the comparison was a product of Cabot Corporation, Cab-O-Sil Division, Tuscola, Ill.

Example 1

Synthesis of $(CH_3)_3Si[OSi(CH_3)_2]_3Cl$, i.e., $MD_3Cl$ Using DMF and Acetonitrile In a 500 mL scale reaction, hexamethylcyclotrisiloxane $D_3$ (110 g, 0.49 mol) and trimethylchlorosilane $Me_3SiCl$ (110 g, 1.0 mol) were mechanically stirred at room temperature (20–25° C.) until $D_3$ dissolved. Acetonitrile (6.2 g, 5.6 wt % of $D_3$) and N,N-dimethylformamide (DMF) (2.3 g, 2 wt % of $D_3$) were added, and the mixture was stirred for an additional 3 hours at room temperature. After adding xylenes (43 g), low boiling point solvents were removed on a rotary evaporator. The concentrate was fractionally vacuum distilled, and a portion (67–70° C., ~5 torr) was collected (82 g). The purity was 90% based on GC, and the yield was about 46%. Analysis by GC/Mass Spectrometry (MS) identified $MD_3Cl$ as the major product, i.e., mass 330. The analysis also indicated that other components such as $MD_2Cl$ and $MD_4Cl$ were present.

Example 2

Synthesis of A—$D_3M$ from $MD_3Cl$

In a 250 mL scale reaction, a mixture of apophyllite (5 g, 5.5 mmol), $MD_3Cl$ (90%, 65 g, 177 mmol), and DMF (120 g, 1.64 mol), was refluxed for 3 hours, cooled, and filtered. The product was washed with acetone (100 mL×2), a mixture of acetone and water (1:1, 200 mL×5), and acetone (250 mL×4). The product was dried under vacuum at 80° C. for 1 hour, and 5.1 g of A—$D_3M$ was obtained. XRD analysis showed a d-spacing of 17 angstrom. In a 1 L scale reaction, 20.1 g of A—$D_3M$ was obtained. It was found that both samples formed gels when mixed with silanol terminated PDMS after several hours or several days, depending upon the molecular weight of the silanol terminated PDMS.

Scanning Electron Microscopy (SEM) of the apophyllite mineral used in this example showed that the apophyllite mineral powder was composed of irregularly shaped particles ranging in size from a few microns to hundreds of microns. The particles in the apophyllite mineral powder were determined to be more angular and denser than were the particles in the resulting A—$D_3M$ powder. SEM of A—$D_3M$ showed that the majority of the particles in the A—$D_3M$ powder were of a size less than 60 microns. The A—$D_3M$ powder particles were multi-layered and appeared less tightly packed than layers in the apophyllite mineral powder.

Example 3

TEM of an A—$D_3M$ Filled Elastomer

A—$D_3M$ powder prepared in Example 2 (0.5 g, 5 wt %) was allowed to stand in a silanol terminated PDMS (Mw 4200, 9.5 g) for one week until a flowable viscous gel had been obtained. No agitation was applied during the week. However, after the week, the gel was agitated using a sonic probe for 30 minutes until a non-flowable thick gel was obtained. The gel was cured using methyltrioximosilane $CH_3Si(ON=CH_2)_3$ as a crosslinking agent in combination with a tin catalyst. A thin section of the cured elastomer was obtained using a standard cryo-ultramicrotomy technique. TEM showed that exfoliation had occurred, although some portions of A—$D_3M$ were still visible. It was also noted that layers in the particles were not densely packed, and that the majority of layers that had been exfoliated were less than 200 nm in thickness and were well dispersed. XRD showed a disappearance of low angle peaks of A—$D_3M$, which supports exfoliation of the sheet structures in the systems according to this invention.

Example 4

Rheology Data & Mechanical Properties

Several silanol terminated PDMS were used as matrices in this example. One was a material available as a commercial product from Gelest Inc., Tullytown, Pa., and identified as their DMS-S27 (Mw 18,000). The other materials were polydimethylsiloxanes having a viscosity ranging from about 11,000 to 14,000 mPa.s at 25° C., and wherein about 85 to 95 percent of the terminal groups were silanol, and about 5 to 15 percent of the terminal groups were trimethylsiloxy. The latter polymeric materials generally had a Mw of about 64,000.

Fumed silica (Cab-O-Sil TS 530) and A—$D_3$M at loadings of 0.5 wt % and 1.5 wt %, respectively, were used as the filler. Rheology data showed A—$D_3$M to be a more effective thickener for siloxane fluids.

Thus, a gel resulted from a sitting/sonification procedure using 5 wt % A—$D_3$M in a silanol terminated PDMS (Mw 4200). The use of 5 wt % of A—$D_3$M in a silanol terminated PDMS (Mw 18,000), provided a thick and non-flowable gel which was also obtained after sitting for several days to allow the A—$D_3$M to swell, followed by sonification (60% output, 50 min). In contrast, however, the use of 5 wt % fumed silica and sonification provided only a flowable viscous liquid.

The mechanical properties of cured elastomers resulting from Gelest's DMS-S27 (Mw 18,000) as a matrix were also measured, and these results are shown below in Table 1. Table 1 reveals that generally speaking, A—$D_3$M filled systems possess superior mechanical properties, than comparable systems containing fumed silica.

TABLE 1

| Filler | Loading wt % | Tensile psi | Elongation % | 50% Stress psi | 100% Stress psi | Durometer Shore A |
|---|---|---|---|---|---|---|
| TS-530 | 0.5 | 74 | 125 | 35 | 54 | 31 |
| A-$D_3$M | 0.5 | 81 | 145 | 35 | 56 | 31 |
| TS-530 | 1.5 | 71 | 135 | 32 | 52 | 27 |
| A-$D_3$M | 1.5 | 113 | 151 | 48 | 77 | 30 |
| TS-530 | 5.0 | 173 | 218 | 46 | 78 | 43 |
| A-$D_3$M | 5.0 | 190 | 128 | 97 | 155 | 46 |

It should be understood that elastomeric systems can be formed using crosslinking agents other than methyltrioximosilane. For example, among some other suitable silanes which can be employed are methyltrimethoxysilane, tetramethoxysilane, vinyltrioximosilane, and tetraoximosilane. The hydrolyzable groups of such silanes react with the terminal hydroxyls of the silanol terminated PDMS to form a capped silicone polymer, which is capable of curing, typically in the presence of a filler and a catalyst. Catalysts suitable for this purpose include organotitanates such as tetraisopropyl titanate and tetrabutyl titanate; and organometallic compounds such as dibutyltin dilaurate, tin octoate, dibutyltin diacetate, and zinc octoate.

In view of the above, it should also be noted that A—$D_3$M can be used as a filler not only as a substitute for fumed silica, but also as a substitute for other conventional fillers such as silica aerogel, precipitated silica, diatomaceous earth, calcium carbonate, quartz, zirconium silicate, carbon black, titanium dioxide, iron oxide, alumina, zinc oxide, and barium silicate.

In the following example, $(CH_3)_3Si[OSi(CH_3)_2]_3Cl$, i.e., $MD_3Cl$, of a higher purity was prepared from $D_3$ and $(CH_3)_3SiCl$.

Example 5

Synthesis of $MD_3Cl$ Using DMAC & Acetonitrile

A mixture of $D_3$ (399.48 g, 1.796 mol), acetonitrile (121.04 g, 2.949 mol), dimethyl acetamide DMAC (12.0882 g, 0.139 mol), and $Me_3SiCl$ (197.09 g, 1.814 mol) was magnetically stirred at room temperature under a nitrogen blanket. Heat was applied intermittently in amounts sufficient to dissolve $D_3$ and the heating was ceased upon dissolution. The reaction was continued at room temperature overnight, i.e., about 17.5 hours). GC analysis of the mixture showed the presence of 32% $MD_3Cl$. Low boiling materials were removed under vacuum on a rotary evaporator at room temperature. The residue was filtered, and a precipitated white solid believed to be a mixture of $D_3$ and a DMAC—HCl salt, was removed. The filtrate was strip distilled twice on a Hennion Design Head, i.e. a "J-head". The first distillation at a head temperature of 53–63° C./8 mm Hg was carried out to further remove low boiling point materials from the mixture, and to remove solid materials which had collected on a cold finger of the J-head. The second distillation at a head temperature of 70–100° C./8 mm Hg provided 215.52 g (36.2%) of distillate rich in $MD_3Cl$, and 144.78 g (24.4%) of residue rich in $MD_6Cl$. The distillate was purified by distillation on a 4 ft stainless steel spinning band column. This procedure produced 80.99 g (13.6%) of $MD_3Cl$ boiling at 65–66° C./4 mm, indicating 97% purity.

Example 5 demonstrates a procedure for the synthesis of highly purified forms of $MD_3Cl$ in which $D_3$ and $Me_3SiCl$ can be reacted in the presence of DMAC as a catalyst and acetonitrile as a solvent, followed by careful purification. The main by-product of the synthesis was $MD_6Cl$.

In the following examples, samples of $MD_3Cl$ prepared in Example 5 were used to modify an apophyllite mineral.

Example 6

Modification of Apophyllite Mineral with $MD_3Cl$

The same amount of apophyllite was used as in Example 2, but only about half the amount of $MD_3Cl$ and DMF. Thus, apophyllite mineral (5.12 g, 5.6 mmol, 100 mesh) was stirred at room temperature with 64 ml of anhydrous DMF under a nitrogen blanket for 18 hours. $MD_3Cl$ (29.23 g, 88.3 mmol) was added, and the mixture was refluxed for 3 hours, cooled, and filtered. The product was washed with acetone (200 ml), a mixture of 1/1 acetone/water (1000 ml), and finally with acetone (1000 ml). It was dried for 45 minutes at 60° C. and for 50 minutes at 86° C. There was obtained 4.47 g of a white powdered A—$D_3$M.

One criteria used to characterize materials in Example 6 was apparent volume. For purposes of this invention, "apparent volume" is defined as the volume occupied by one gram of powder sitting in a glass vial.

Apparent Volume can be expressed by the relationship $V_{a=\pi R}{}^2 H$ where R is the radius of the glass vial, and H is the height of the powder in the vial. A comparison between apparent volume of the starting apophyllite mineral (A) used in Example 6, and apparent volume of the A—$D_3$M product, indicated that $V_a$ for the A—$D_3$M was 3.3 times $V_a$ for A. This verified the interlayer grafting of —$D_3$M groups, resulting in an increase of basal spacing, which increased the apparent volume.

The materials were also analyzed using Fourier transform infrared spectroscopy (FTIR). In the FTIR spectra of apophyllite mineral used in Example 6, it was noted that in the O—H stretching vibration region of apophyllite mineral, there was a sharp band at 3556 $cm^{-1}$ and a broad band at 3026 $cm^{-1}$, assigned respectively, to O—H groups involved in a relatively weak hydrogen bond, and to O—H groups involved in a relatively strong hydrogen bond. After reacting apophyllite mineral with $MD_3Cl$, the bands at 3556 and 1695 cm$^{-1}$ disappeared, and there appeared sharp bands at 2855–2964 cm$^{-1}$, assigned to $n_{C-H}$ stretching vibrations of —CH$_3$ groups (anti-symmetric and symmetric), as well as a sharp band at 1264 cm$^{-1}$, assigned to the symmetric deformation vibration of these groups. Bands at 758 and 847 cm$^{-1}$ were assigned to (CH$_3$)$_3$Si—O— groups, and a band at 810 cm$^{-1}$ corresponded to anti-symmetric CH$_3$ rocking and Si—C stretching vibrations. Also noted in the spectrum of A—D$_3$M was the absence of bands at 520 and 590 cm$^{-1}$, corresponding to symmetric and anti-symmetric stretching vibrations of Si—Cl. These results verified that MD$_3$Cl had been grafted on the apophyllite mineral.

X-ray diffraction patterns of A—D$_3$M showed a single peak at 2θ equal to 5.4°, corresponding to an interlayer distance of 16.4 Å, and the absence of signals corresponding to apophyllite mineral. These patterns also showed that the reaction in Example 6 had occurred. The XRD signal in Example 6 had a much higher intensity and a narrower width, than signals from A—D$_3$M prepared according to prior examples, where twice the amount of MD$_3$Cl and DMF had been employed.

Example 7

Isolation of MD$_6$Cl

Components in the residue from the second "J-head" distillation in Example 5 containing 46% MD$_6$Cl were isolated by fractional distillation using a 4 ft stainless steel spinning band column. 44.1 g (26.7%) of a material rich in MD$_6$Cl was produced. GC analysis of this material showed that it contained 81% MD$_6$Cl and 18% MD$_6$M. This was verified by Electron Impact Gas Chromatographic Mass Spectroscopy (EI GC-MS) analysis which showed the presence of a main signal corresponding to MD$_6$Cl and a smaller signal corresponding to MD$_6$M.

In the following examples, apophyllite mineral was modified using MD$_3$Cl, and the procedures of Examples 2 and 6 were further improved producing modified apophyllite mineral A—D$_3$M using only 37% MD$_3$Cl and 37% N,N-dimethylformamide. These examples also show a procedure for modifying apophyllite mineral with (CH$_3$)$_3$Si[OSi(CH$_3$)$_2$]$_6$Cl, i.e., MD$_6$Cl. In the latter case, XRD analysis of A—D$_6$M showed a slightly higher interlayer spacing compared to the interlayer spacing for A—D$_3$M.

Example 8

Modification of Apophyllite Mineral with MD$_3$Cl

Apophyllite mineral was modified by premixing it at room temperature with DMF over night prior to the addition of MD$_3$Cl, and heating the mixture to 145° C. for 3 hours. This technique provided an A—D$_3$M product with improved quality XRD signals, and increased efficiency by reducing the amounts of MD$_3$Cl and DMF needed to carry out the reaction. Runs were conducted using decreasing amounts of MD$_3$Cl and DMF. These runs, the experimental conditions, and the XRD results of products are shown in Table 2.

TABLE 2

Modification Reactions of Apophyllite Using MD$_3$Cl

| Run | $m_A$ (g) | $V_{DMF}/m_A$ (ml/g) | $mol_{Si-Cl}/mol_{Si-(A)}$[a] | $m_{A-D3M}$ (g) | d(Å)[b] (XRD) | I(A)[c] (XRD) |
|---|---|---|---|---|---|---|
| 1[d] | 5.00 | 25.40 | 4.08 | 5.10 | 15.8– | 40–192 |

TABLE 2-continued

Modification Reactions of Apophyllite Using MD$_3$Cl

| Run | $m_A$ (g) | $V_{DMF}/m_A$ (ml/g) | $mol_{Si-Cl}/mol_{Si-(A)}$[a] | $m_{A-D3M}$ (g) | d(Å)[b] (XRD) | I(A)[c] (XRD) |
|---|---|---|---|---|---|---|
|  |  |  |  |  | 17.0 |  |
| 9[e] | 5.12 | 12.50 | 1.87 | 4.47 | 16.4 | 221 |
| 11[e] | 4.01 | 9.48 | 1.51 | 3.43 | 17.0 | 330 |
| 10[e] | 5.13 | 6.24 | 0.70 | 3.34 | 7.7 | — |

In reference "a" in Table 2, the "mol Si(A)" represents the number of moles of silicon atoms in the apophyllite mineral. Reference "b" is the interlayer spacing. Reference "c" is peak intensity. Reference "d" indicates that the product was made by reacting apophyllite mineral with DMF and MD$_3$Cl for 3 hours under reflux of DMF. Reference "e" indicates that the product was made by premixing apophyllite mineral with DMF for 18 hours at room temperature, MD$_3$Cl was added, and then the mixture was heated for 3 hours at 145° C.

Example 9

Modification of Apophyllite Mineral with MD6Cl

Using the same experimental conditions of Run 11 in Table 2, apophyllite mineral was modified with MD$_6$Cl. GC, Electrospray MS, EI GC-MS, and $^{29}$Si NMR analysis indicated that the MD$_6$Cl used in this example contained 81% of MD$_6$Cl and 18% of MD$_6$M according to GC. The conditions and XRD results of this Run 12 are shown in Table 3. For purposes of comparison, Table 3 shows Run 11 from table 2 where MD$_3$Cl was employed.

TABLE 3

Modification of Apophyllite with MD$_3$Cl & MD$_6$Cl

| Run | Chloro-siloxane | $m_A$(g) | $V_{DMF}/m_A$ (ml/g) | $mol_{Si-Cl}/mol_{Si-(A)}$ | $m_{A-DnM}$ (g) | d(Å) (XRD) | I(A) (XRD) |
|---|---|---|---|---|---|---|---|
| 11 | MD$_3$Cl | 4.01 | 9.48 | 1.51 | 3.43 | 17.0 | 330 |
| 12 | MD$_6$Cl | 5.01 | 9.18 | 1.45 | 4.33 | 17.6 | 215 |

The modification of apophyllite mineral with MD$_6$Cl was confirmed by XRD. Other confirming evidence was that the ratio of the apparent volume of modified apophyllite mineral A—D$_6$M to that of apophyllite mineral A, was higher for A—D$_6$M than the corresponding ratio of A—D$_3$M. Thus, $V_a$(A—D$_6$M)/$V_a$(A) was 3.62 whereas $V_a$(A—D$_3$M)/$V_a$(A) was 2.77.

Table 3 shows that under equivalent conditions, the A—D$_6$M had a higher interlayer spacing of 17.6 Å than that of A—D$_3$M which had a spacing of 17.0 Å. Both materials, however, are suitable as fillers in manufacturing resin-based or elastomer-based based nanocomposites. For purpose of comparison, A–M minerals prepared under the same or equivalent conditions have an interlayer spacing of 15.4 Å which is less than that of A—D$_3$M.

$^{29}$Si solid state NMR confirmed that such siloxane-modified apophyllite mineral materials have a structure which can be ideally represented by the formula A—D$_n$M where A is apophyllite mineral, D is difunctional unit (CH$_3$)$_2$SiO$_{2/2}$, M is monofunctional unit (CH$_3$)$_3$SiO$_{1/2}$, and n is 3 or 6. $^{29}$Si solid state NMR also confirmed that percent modification of apophyllite mineral was consistently in a range of about 16 to about 22 percent whether apophyllite mineral was modified with $MD_3Cl$ or $MD_6Cl$.

The purpose of the following example is to show modification reactions of apophyllite mineral with $MD_3Cl$ in which XRD analysis indicated the reproducibility of interlayer spacing at values differing by less than about 5 percent.

Example 10

Modification of Apophyllite Mineral

Run 32 was conducted at the same conditions as Run 9 in Example 8 (Table 2) to verify the reproducibility of results. Run 15 was conducted at the same conditions as Run 11 in Example 8 (Table 2). The conditions and XRD results of Runs 1, 9, 10, 11, 15, and 32, are shown in Table 4.

TABLE 4

Modification of Apophyllite Mineral With $MD_3Cl$

| Run | $V_{DMF}/m_A$ ml/g | Si—Cl/Si-(A) | d(Å) XRD | I(A) XRD |
|---|---|---|---|---|
| 9 | 12.50 | 1.87 | 16.4 | 221 |
| 11 | 9.48 | 1.51 | 17.0 | 330 |
| 15 | 9.32 | 1.47 | 17.2 | 365 |
| 32 | 12.50 | 1.93 | 17.2 | 170 |

Table 4 shows that for Runs 9 and 32 on the one hand, and Runs 11 and 15 on the other hand, interlayer spacing was reproducible at values differing by less than about 5 percent. A—$D_3M$ materials prepared in this example were analyzed by quantitative $^{29}Si$ solid-state NMR, and the analytical results are shown in Table 5.

TABLE 5

$^{29}Si$ Solid-State NMR of A-$D_nM$ (n = 0, 3, & 6)

| Run | Mineral | M % | D % | T % | Q % | M/T + Q | D/M |
|---|---|---|---|---|---|---|---|
| 26 | A-M | 32.5 | 0 | 31.0 | 36.5 | 48.1 | 0 |
| 1 | A-$D_3M$ | 30.9 | 0 | 23.3 | 37.1 | 51.1 | 0 |
| 11 | A-$D_3M$ | 14.7 | 18.6 | 22.3 | 44.4 | 22.0 | 1.27 |
| 12 | A-$D_6M$ | 10.8 | 20.6 | 23.9 | 44.7 | 15.7 | 1.91 |

In Table 5, M and D represent rigid units having chemical shifts of 13 and −14 ppm, respectively. T and Q represent trifunctional $O_{3/2}$ Si—OH units and tetrafunctional $O_{4/2}$ Si units of the apophyllite sheets having chemical shifts of −100 and −108 ppm, respectively. A—$D_3M$ prepared in Run 1 also showed mobile M and D units, i.e., 1.6% and 7.1%, having chemical shifts of 7 and −23 ppm, respectively.

Thermogravimetric analysis (TGA) showed that the grafting of a siloxane group on the apophyllite mineral increased its thermal stability both under air and helium. The measurements were carried out on a Universal V2.OK TA Instruments Company instrument, from room temperature to 800° C. with a ramp of 10° C./minute. The TGA results are shown below in Tables 6 and 7.

TABLE 6

Thermogravimetric analysis of apophyllite & modified apophyllite, i.e., A-$D_nM$ where n is 3 or 6, under air.

| | $T_0$ (° C.)$^a$ | $T_5$ (° C.)$^b$ | $T_i$ (° C.)$^c$ | Y (%)$^d$ |
|---|---|---|---|---|
| Apophyllite | 55.6 | 235.2 | 240.3, (304.4), 436.1 | 82.7 |

TABLE 6-continued

Thermogravimetric analysis of apophyllite & modified apophyllite, i.e., A-$D_nM$ where n is 3 or 6, under air.

| | $T_0$ (° C.)$^a$ | $T_5$ (° C.)$^b$ | $T_i$ (° C.)$^c$ | Y (%)$^d$ |
|---|---|---|---|---|
| A-$D^3M$ | 25.9 | 468.5 | 491.7, (540.7) | 86.7 |
| A-$D_6M$ | 25.9 | 478.5 | 487.8 | 87.9 |

TABLE 7

Thermogravimetric analysis of apophyllite & modified apophyllite under helium.

| | $T_0$ (° C.)$^a$ | $T_5$ (° C.)$^b$ | $T_i$ (° C.)$^c$ | Y (%)$^d$ |
|---|---|---|---|---|
| Apophyllite | 68.5 | 225.9 | 230.2, (296.9), 433.7 | 82.6 |
| A-$D_3M$ | 25.9 | 464.4 | (470.4), 545.5, (694.4) | 86.3 |
| A-$D_6M$ | 25.9 | 491.1 | (472.9), 541.1, (700.7) | 87.7 |

In Tables 6 and 7, reference "a" is the temperature at the beginning of decomposition, "b" is the temperature at 5% weight loss, "c" is the temperature at the inflection point corresponding to a maximum decomposition, and "d" is char yield at 800° C.

Other variations may be made in compounds, compositions, and methods described herein without departing from the essential features of the invention. The embodiments of the invention specifically illustrated herein are exemplary only and not intended as limitations on their scope except as defined in the appended claims.

We claim:

1. A method of making a polysiloxane sheet or tube polymer comprising contacting a sheet or tube silicate with an halogen endblocked halosiloxane, in the presence of a polar solvent or combination of polar and non-polar solvent; and heating the mixture until a polysiloxane sheet or tube polymer is formed having pendant siloxane groups; the halogen endblocked halosiloxane having the formula

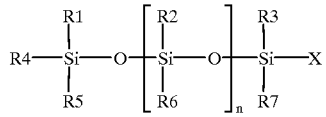

where X represents chlorine, fluorine, bromine, or iodine; R1 to R7 are alkyl groups containing 1–6 carbon atoms, aryl groups, alkaryl groups, or aralkyl groups; with the proviso that one of the groups R1, R4, and R5 can represent X; and n is an integer having a value of 2 to about 20.

2. A method according to claim 1 in which the silicate is selected from the group consisting of apophyllite $KCa_4Si_8O_{20}(OH,F).8H_2O$, $K_2CuSi_4O_{10}$, magadiite $Na_2Si_{14}O_{29}.7H_2O$, kenyaite $Na_2Si_{22}O_{45}.9H_2O$, silinaite $NaLiSi_2O_5.2H_2O$, and chrysotile $Mg_3(OH)_4Si_2O_5$.

3. A method according to claim 1 in which the solvent is selected from the group consisting of N,N-dimethylformamide, dimethyl sulfoxide, 1-methyl-2-pyrrolidinone, 1,3-dimethyl-3,4,5,6-tetrahydro-2(1H)-pyrimidinone, toluene, xylenes, acetonitrile, and dimethyl acetamide.

4. A method according to claim 1 in which n is 2 to 5.

5. A polysiloxane sheet or tube polymer prepared according to the method defined in claim 1.

6. A composition comprising a mixture of a polysiloxane sheet or tube polymer prepared according to the method defined in claim 1, and an organosilicon component selected from the group consisting of methyl endblocked silicone fluids, silanol terminated polydimethylsiloxanes, vinyl terminated polydimethylsiloxanes, silicone resin matrices, cyclic polysiloxane hydrides, and elastomeric polysiloxanes.

7. A composition according to claim 6 in which the mixture is cured to a gelatinous or elastomeric state.

* * * * *